United States Patent [19]
Gomez

[11] Patent Number: 5,630,960
[45] Date of Patent: May 20, 1997

[54] MICROWAVE COOKING APPARATUS WITH AIR CIRCULATION MEANS

[76] Inventor: Julio A. Gomez, 79 Amelia Street, Nundah Queensland 4012, Australia

[21] Appl. No.: 501,136
[22] PCT Filed: Jul. 27, 1994
[86] PCT No.: PCT/AU94/00033
  § 371 Date: May 21, 1996
  § 102(e) Date: May 21, 1996
[87] PCT Pub. No.: WO94/16606
  PCT Pub. Date: Aug. 4, 1994

[30] Foreign Application Priority Data

Jan. 28, 1993 [AU] Australia ............... PL 6984

[51] Int. Cl.⁶ ............... H05B 6/80; A47J 36/34
[52] U.S. Cl. ............... 219/732; 219/735; 219/754; 219/763; 99/DIG. 14; 426/243
[58] Field of Search ............... 219/732, 734, 219/735, 753, 754, 763; 99/DIG. 14; 426/241, 243

[56] References Cited

U.S. PATENT DOCUMENTS

| | | | |
|---|---|---|---|
| 4,074,102 | 2/1978 | Asen | 219/732 |
| 4,260,060 | 4/1981 | Faller | 219/732 |
| 4,283,614 | 8/1981 | Tanaka et al. | 219/754 |
| 4,539,455 | 9/1985 | Colato et al. | 219/754 |
| 4,659,890 | 4/1987 | Viet | 219/753 |
| 4,745,249 | 5/1988 | Daniels | 219/732 |
| 4,847,461 | 7/1989 | Gilmore | 219/732 |
| 4,877,932 | 10/1989 | Berstein et al. | 219/732 |
| 5,008,508 | 4/1991 | Skerker et al. | 219/732 |
| 5,223,685 | 6/1993 | DeRienzo, Jr. | 219/732 |

FOREIGN PATENT DOCUMENTS

| | | |
|---|---|---|
| 556698 | 8/1993 | European Pat. Off. . |
| 55-6138 | 1/1980 | Japan . |
| 84-01045 | 8/1985 | Sweden . |
| 512024 | 8/1939 | United Kingdom . |
| 2099989 | 12/1982 | United Kingdom . |
| 2215187 | 9/1989 | United Kingdom . |

*Primary Examiner*—Philip H. Leung
*Attorney, Agent, or Firm*—Arelman, Frayne & Schwab

[57] ABSTRACT

An apparatus for allowing air to circulate around food being heated in a microwave oven serves to expose a substantial surface area of the bottom of the food to the air circulating in the microwave oven under the control of the microwave oven fan. The apparatus has a base (25) which, in use, is normally supported on a rotating turntable of the microwave oven and rotates with the turntable. The apparatus also has a plurality of spaced apart support structures (29) or raised legs which extend upwardly from the base (25) and support the food in spaced relation thereto so that air may circulate in the space between the bottom of the food and the base (25). Slots (28) passing through the base may be present and these will allow air to flow from beneath the base (25) to the space around the support structures (29). Additionally, the apparatus may include air flow directional structures (27) which extend downwardly from the base (25) and can be supported on the turntable. The air flow directional structures (27), which may have curved profiles to preferentially direct air, co-operate with the slots (28) to direct air to flow from beneath the base (25) to the space around the support structures (29).

8 Claims, 4 Drawing Sheets

MICROWAVE COOKING APPARATUS WITH AIR CIRCULATION MEANS

FIELD OF THE INVENTION

The present invention relates to the microwave heating or cooking of food and, in particular, to an apparatus that can be used in conjunction with a conventional microwave oven to improve the quality of food cooked therein.

BACKGROUND ART

It is a common problem that when some pre-baked foods, such as pastries, battered fish and pizzas which have a high moisture content, are heated or cooked in a microwave oven, the resulting product frequently has a soggy or soupy consistency that is generally found unpalatable.

In order to improve its palatability, the soggy product is often reheated in the same microwave oven or placed in a conventional electric heating oven to evaporate the excess moisture therefrom. Although this may remove some of the moisture from the product, it may also have the undesired affect of burning parts of the food, such as the edges of a pastry, and is wasteful of energy.

It has been found that most of the moisture in soggy microwaved foods accumulates at the bottom of the food nearest the plate upon which the food sits. This has been attributed to poor or ineffective air circulation in the region between the food and the microwave plate, which is thought to create a sink for the concentration of moisture exited during microwave energization of the water molecules in the food.

It is, therefore, an object of the present invention to improve the circulation of air around rood being heated or cooked in a microwave oven so as to avoid the shortcomings of the prior art.

SUMMARY OF THE INVENTION

According to the invention there is provided an apparatus for allowing air to circulate around food being heated in a microwave oven, said apparatus comprising a base adapted to be supported on a rotating turntable of the microwave oven, and a plurality of spaced apart support means extending upwardly from the base for supporting the food in spaced relation to the base, the arrangement being such that during microwave heating, air circulates in the space around the support means between the food and base.

In a preferred form of the invention, the base includes a plurality of slots formed therethrough that are adapted to allow air to flow from beneath the base to the space around the support means.

Preferably, the base includes air flow directional means extending downwardly from the base and adapted to be supported on the said turntable, said air flow directional means being adapted to direct air to flow from beneath the base to the space around the support means.

It is also preferred that the air flow directional means comprises a plurality of spaced apart elongated members that are arranged in such a way that they can impel and direct air to the space around the support means when the turntable is rotating in either a clockwise or anticlockwise direction.

The base is preferably circular in shape and the plurality o spaced apart food support means may have a cylindrical shape.

The present invention may also include vented lid means adapted to be supported concentrically on the base for covering the food.

Preferably, the slots in the base are distributed substantially evenly in the base.

It is further preferred that the food support means are distributed substantially evenly over the base.

BRIEF DESCRIPTION OF THE DRAWINGS

In order that the invention may be more readily understood and put into practical effect, reference will be made to the accompanying drawings, in which.

DESCRIPTION OF PREFERRED EMBODIMENTS

Figure 1:
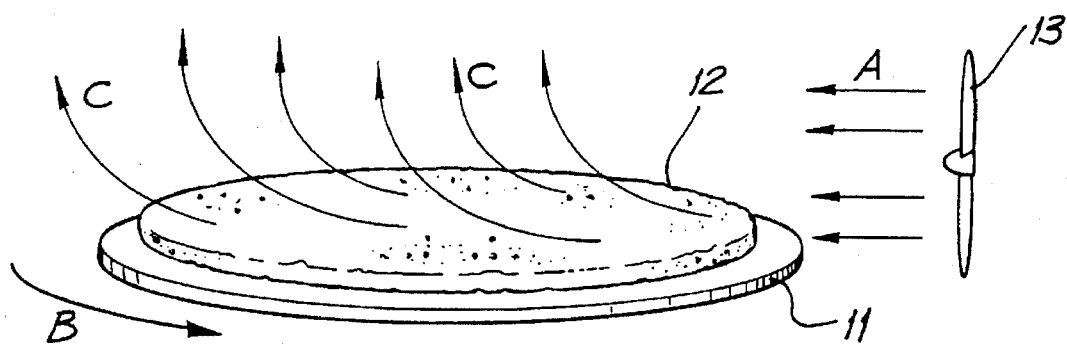
FIG. 1 is a perspective view of a pastry being heated on a conventional microwave oven turntable plate.

A conventional turntable plate 11 of a microwave oven is shown in FIG. 1 supporting a pastry 12. During operation of the microwave oven, a fan 19 blows air in the direction of arrows A towards and above the pastry 12, and the turntable plate 11 rotates in the direction shown by arrow B. Some moisture is evaporated off the pastry 12 as shown by the arrows C. However, the combination of air being blown over the pastry 12 and the pastry being supported flat on the plate 11 creates an area of poor air circulation at the bottom of the pastry, particularly around the bottom centre of the pastry where there is no direct exposure to fanned air. A substantial amount of moisture remains at the bottom of the pastry which becomes moist or soggy and unpalatable as a result.

The use of food support apparatus according to various embodiments of the invention as shown in FIGS. 2 to 5 will substantially overcome this problem by providing a pathway for circulation of air beneath the pastry during operation of the microwave oven.

Figure 2:
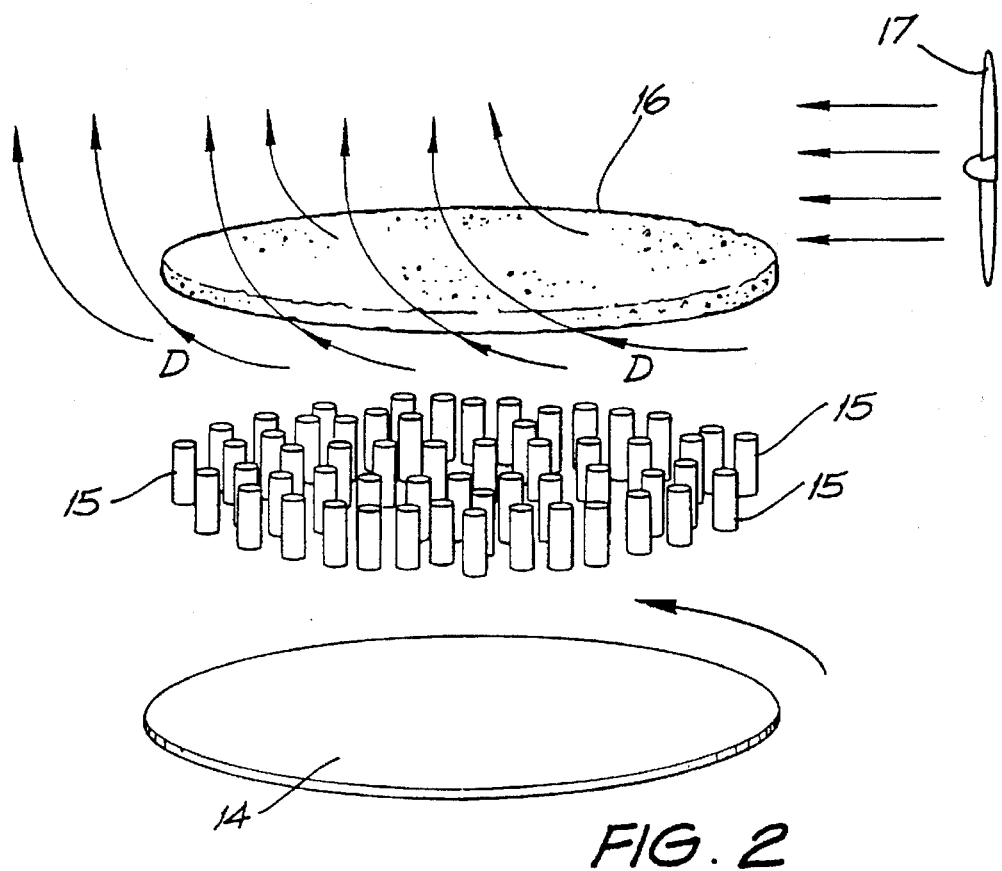
FIG. 2 is an exploded perspective view of an apparatus according to a first preferred embodiment of the invention used to support a pastry being heated in a microwave oven.

For instance, in FIG. 2, the food support apparatus (shown in an exploded view) comprises a base 14 adapted to be supported on a rotating turntable of a microwave oven (not shown) and a plurality of spaced apart cylindrical support means 15 extending upwardly from the base 14 for supporting the pastry 16 remotely or in spaced relation therefrom.

The support means 15, in this embodiment, are moulded to the base 14, but it is to be understood that the support means used in the apparatus of the invention can be connected to the base by other appropriate means such as with adhesive or screwing to threaded apertures.

The effect of having the pastry 16 rest on the cylindrical support means 15 extending from the base 14 is to create a pathway for allowing air blown by the fan 17 to circulate in the space around the support means 15 and around all outer surfaces of the pastry during operation of the microwave oven. In particular, circulating air may flow across the bottom of the pastry (shown by arrows D) and the heightened pastry surface area exposure to fanned air will facilitate increased evaporation of moisture from the pastry, thereby avoiding any concentration of moisture at the pastry bottom and a resultant soggy food product.

Figure 3:
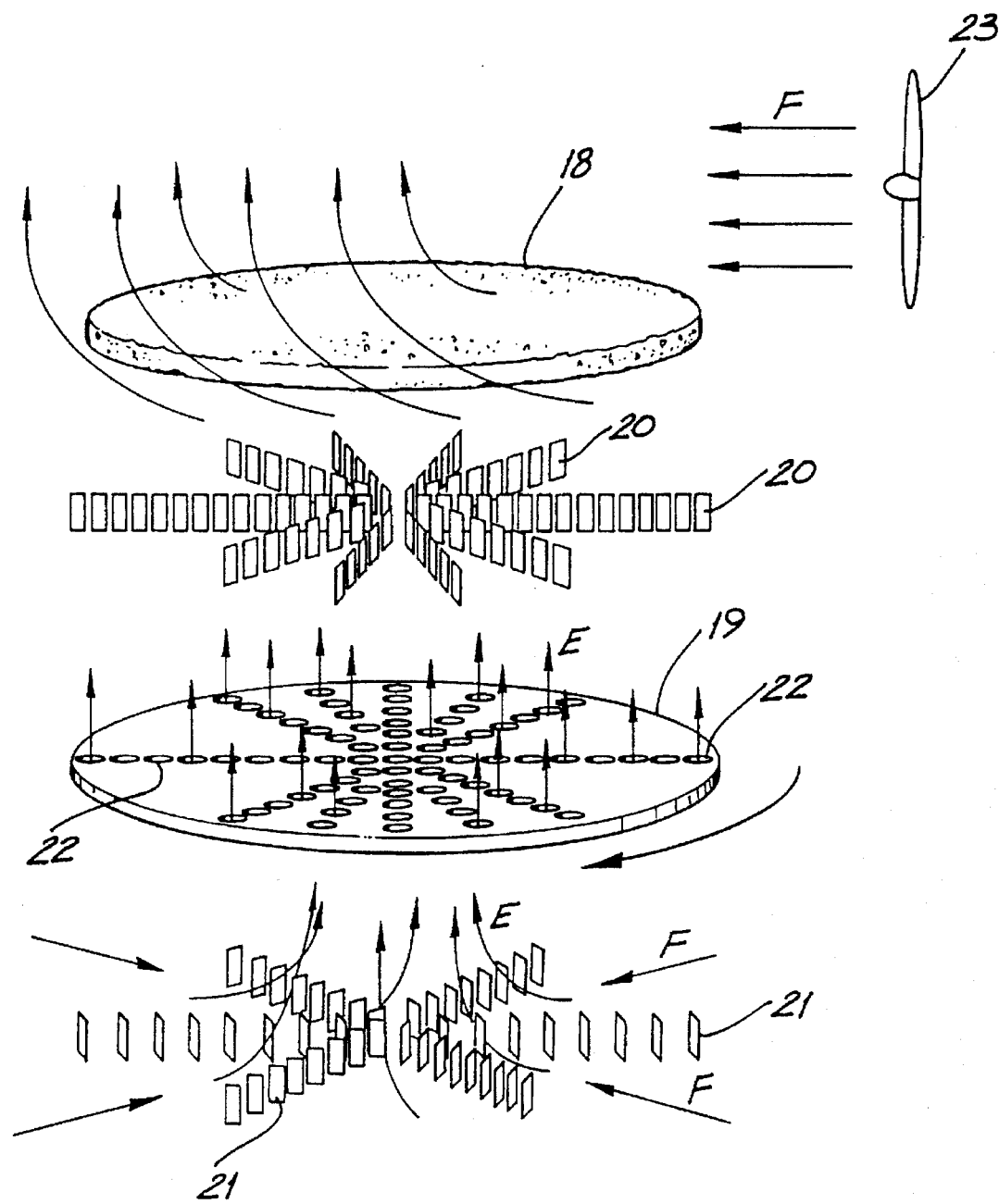
FIG. 3 is an exploded perspective view of an apparatus according to a second preferred embodiment of the invention used to support a pastry being heated in a microwave oven.

The apparatus shown in FIG. 3 for supporting the pastry 18 comprises a base or slotted tray 19, food support means 20 and air flow directional means 21. The air flow directional means 21, which may also serve as legs to support the slotted tray 19, extend downwardly from the tray 19 and are adapted to be supported on a rotating turntable of a microwave oven (not shown).

The tray 19 has slots 22 formed vertically therethrough that are adapted to allow circulating air to flow from beneath the tray 19 to the space around the food support means 20 (as shown by arrows E). Air is preferentially directed through the slots 22 by the effect of the arrangement of the directional means 21 which, in this instance, consist of a plurality of flat card-like members each located at predetermined sites to facilitate air flow up through the slots 22.

The air flow directional means 21, in this embodiment, are moulded to the tray 19, but it is to be understood that the air flow directional means used in the apparatus of the invention can be connected to the base by other appropriate means such as with adhesive.

The symmetrical location of the slots 22 in the tray 19, co-operating with the location of the flat card-like shaped food support members 20, is intended to optimize air flow or circulation across the bottom of the pastry 18.

During operation of the microwave oven, the fan 23 forces air in the direction of arrows F and the effect of the air flow directional means 21 is to cause circulating air to pass upwardly through the slots 22 of the tray 19 (as shown by arrows E) into the region between the tray 19 and the pastry 18. The food support means 20 also serve to allow circulating air to directly enter this region from its sides and the configuration of the card-like shaped support members facilitates the channelling of air entering both from the sides and through the slots 22 towards the bottom centre of the pastry.

The resultant circulation of air around the pastry's outer surface enables the pastry to remain relatively dry and free of concentrated areas of moisture.

Figure 4:
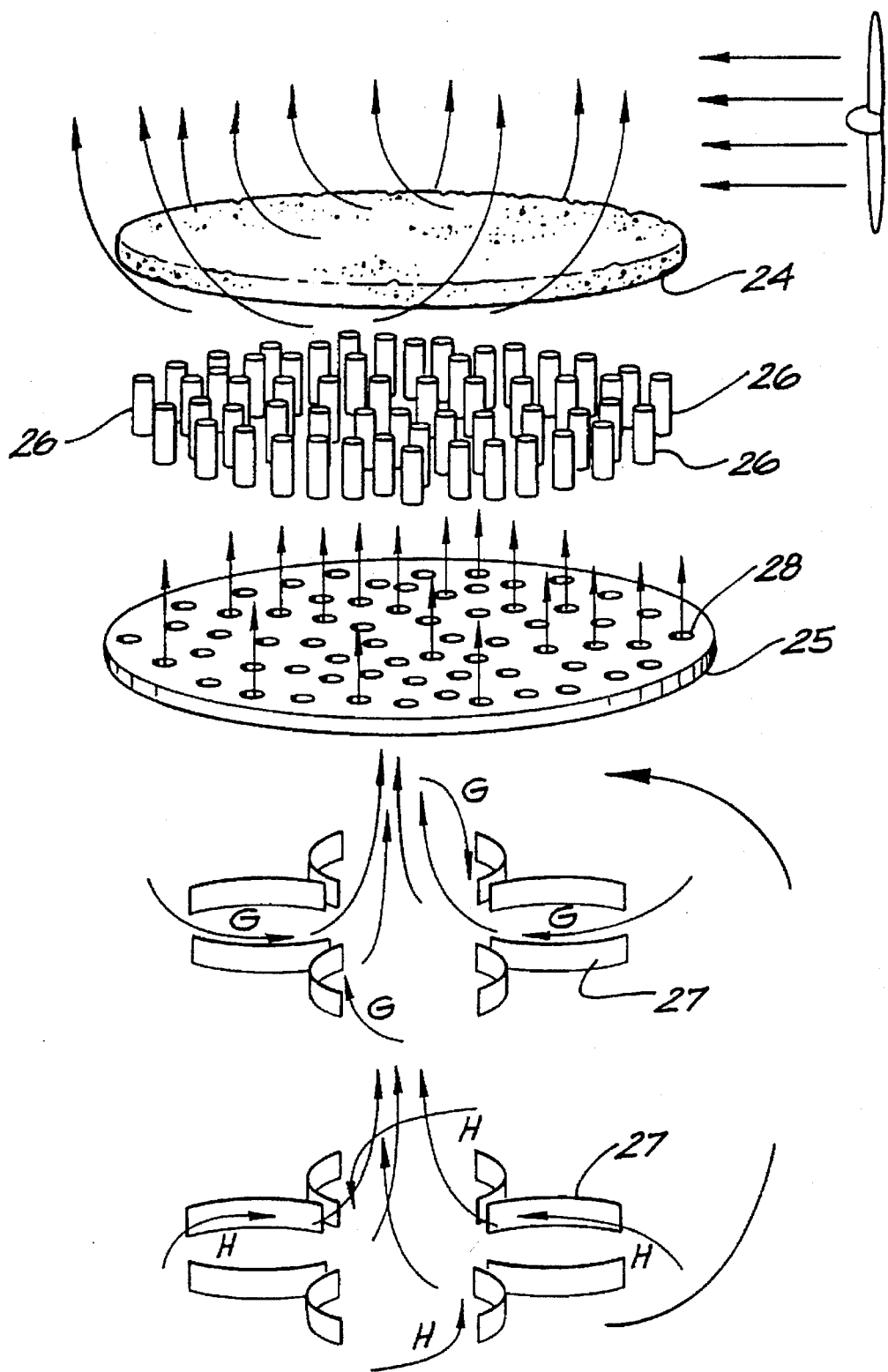
FIG. 4 is an exploded perspective view of an apparatus according to a third preferred embodiment of the invention used to support a pastry being heated in a microwave oven.

The apparatus shown in exploded view in FIG. 4 for supporting the pastry 24 comprises a slotted tray cylindrical food support means 26 and air flow directional means 27. The air flow directional means 27 are shown in duplicate so as to illustrate the different air flow pathways when the turntable of the microwave oven is rotating in either a clockwise or anticlockwise direction. In this embodiment, the air flow directional means 27 are curved members that are moulded to the underside of the tray 25 and arranged so as to cause circulating air to be preferentially directed according to the curved profiles of the curved members towards the centre of the arrangement and upwardly through the slots 28 of the tray 25.

The air flow pathway shown by arrows G and the air flow pathway shown by arrows H correspond to opposite rotating directions for the turntable, and both directions of rotation will have substantially identical effect on directing air upwardly through the slots 28 into the region between the tray 25 and pastry 24. Air directed upwardly in this manner will co-operate with air circulating inwardly from the sides of the food support region to allow effective air circulation around the food being heated in the microwave oven.

Figure 5:
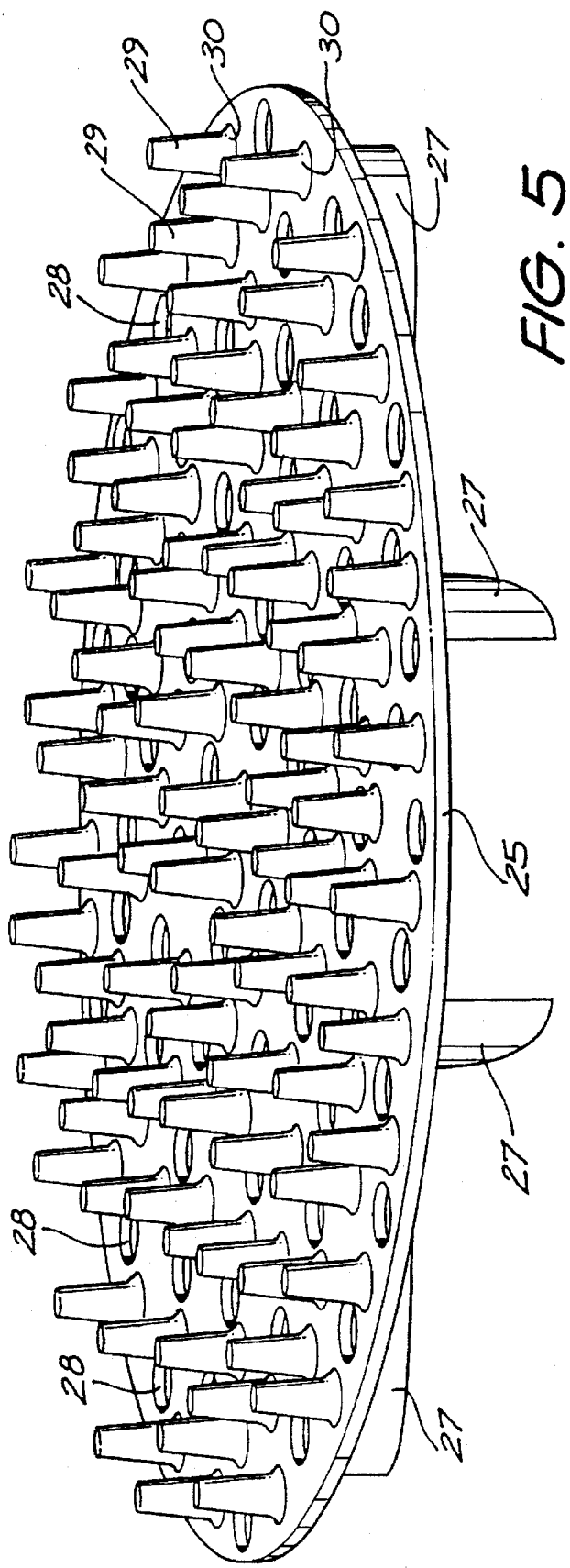
FIG. 5 is a perspective side elevational view of an apparatus similar to that of FIG. 4.

The apparatus shown in FIG. 5 is identical to the apparatus shown in FIG. 4 if unexploded, except that the food support means 29 are not entirely cylindrical but taper outwardly towards the tray 25 and have a curved region 30 where the support means meets the tray 25.

Figure 6:
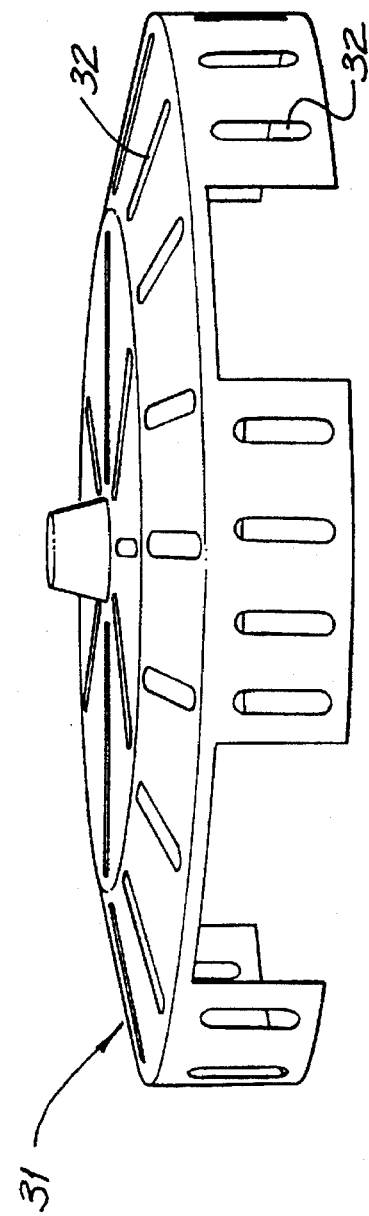
FIG. 6 is a perspective side elevational view of a lid adapted for use with the apparatus of the present invention.

The invention may include a tray lid 31 as shown in FIG. 6. The lid 31 has vent holes 32 that enable air to flow therethrough in a manner that will not disturb the beneficial air circulation effects arising from the apparatus of the invention. The lid 31 will stop food from splattering onto the sides of the oven whilst maintaining air flow and is adapted to be supported on the outer edges of or concentrically on the base. The lid may be of different sizes to suit differently sized microwave ovens.

Various modifications may be made in details of design and construction without departing from the scope or ambit of the invention.

I claim:

1. An apparatus for allowing air to circulate around food being heated in a microwave oven, said apparatus comprising a base adapted to be supported on a rotating turntable of the microwave oven, and a plurality of spaced apart support means extending upwardly from the base for supporting the food in spaced relation to the base, the base including a plurality of slots formed therethrough adapted to allow air to flow from beneath the base to the space around the support means, the base also including air flow directional means extending downwardly from the base and adapted to be supported on said turntable, said directional means comprising a plurality of spaced apart elongated members arranged in such a manner that they can impel and direct air to the space around the support means when the turntable is rotating in either a clockwise or anticlockwise direction.

2. The apparatus of claim 1 wherein the base is circular in shape.

3. The apparatus of claim 1 wherein the base includes legs extending downwardly from the base and adapted to be supported on the said turntable.

4. The apparatus of claim 1 wherein the plurality of spaced apart food support means have a cylindrical shape.

5. The apparatus of claim 1 and including vented lid means adapted to be supported concentrically on the base for covering the food.

6. The apparatus of claim 1 wherein the slots in the base are distributed substantially evenly in the base.

7. The apparatus of claim 1 wherein the food support means are distributed substantially evenly over the base.

8. The apparatus of claim 1 wherein the air flow directional means comprise curved members that are arranged so as to direct air towards the centre of the base wherefrom the air flows upwardly through the slots to the space around the support means.

* * * * *